(12) United States Patent
Ukai et al.

(10) Patent No.: US 12,306,427 B2
(45) Date of Patent: May 20, 2025

(54) VIDEO DISPLAY DEVICE AND VIDEO DISPLAY SYSTEM

(71) Applicant: HITACHI-LG DATA STORAGE, INC., Tokyo (JP)

(72) Inventors: Ryuji Ukai, Tokyo (JP); Takahiro Mouri, Tokyo (JP); Takeru Utsugi, Tokyo (JP); Toshiteru Nakamura, Tokyo (JP); Takuma Kuno, Tokyo (JP); Masahito Uchiyama, Tokyo (JP)

(73) Assignee: HITACHI-LG DATA STORAGE, INC., Tokyo (JP)

( * ) Notice: Subject to any disclaimer, the term of this patent is extended or adjusted under 35 U.S.C. 154(b) by 127 days.

(21) Appl. No.: 17/764,623

(22) PCT Filed: Oct. 6, 2020

(86) PCT No.: PCT/JP2020/037878
§ 371 (c)(1),
(2) Date: Mar. 29, 2022

(87) PCT Pub. No.: WO2021/090625
PCT Pub. Date: May 14, 2021

(65) Prior Publication Data
US 2022/0413204 A1 Dec. 29, 2022

(30) Foreign Application Priority Data
Nov. 8, 2019 (JP) .................................. 2019-202922

(51) Int. Cl.
*F21V 8/00* (2006.01)
*G02B 27/01* (2006.01)
*H04N 9/31* (2006.01)

(52) U.S. Cl.
CPC ....... *G02B 6/0018* (2013.01); *G02B 27/0172* (2013.01); *H04N 9/315* (2013.01); *H04N 9/3182* (2013.01); *H04N 9/3188* (2013.01)

(58) Field of Classification Search
CPC .. G02B 6/0018; G02B 27/0172; H04N 6/315; H04N 6/3182; H04N 6/3188
See application file for complete search history.

(56) References Cited

U.S. PATENT DOCUMENTS

2005/0248818 A1 11/2005 Ouchi et al.
2006/0132914 A1* 6/2006 Weiss ..................... G02B 30/40
359/462

(Continued)

FOREIGN PATENT DOCUMENTS

| CN | 102628988 A | 8/2012 |
|---|---|---|
| JP | 2004-069868 A | 3/2004 |

(Continued)

OTHER PUBLICATIONS

Japanese Office Action received in corresponding Japanese Application No. 2019-202922 dated Nov. 22, 2022.

(Continued)

*Primary Examiner* — Yassin Alata
(74) *Attorney, Agent, or Firm* — MATTINGLY & MALUR, PC

(57) ABSTRACT

According to the invention, a light guide plate-type video display device and a video display system that are capable of displaying a video with less color deviation and less video distortion are provided. A video display device 101 configured to display a video includes a video projection unit 200 configured to project video light, a video deflection unit 210, and a light guide portion 230. The video deflection unit 210 deflects video light emitted by the video projection unit 200 and causes the video light to propagate to the light guide portion 230, and the light guide portion 230 causes the (Continued)

entered video light to propagate therein and outputs the video light. Here, the video deflection unit 210 or the light guide portion 230 is configured to reduce color dispersion of the video light outputted from the light guide portion 230.

13 Claims, 12 Drawing Sheets

(56) References Cited

U.S. PATENT DOCUMENTS

| | | | |
|---|---|---|---|
| 2007/0159673 | A1 | 7/2007 | Freeman et al. |
| 2010/0067110 | A1 | 3/2010 | Hadad et al. |
| 2010/0091031 | A1 | 4/2010 | Tsujimoto |
| 2010/0111472 | A1 | 5/2010 | Dejong |
| 2014/0111865 | A1 | 4/2014 | Kobayashi |
| 2016/0041387 | A1 | 2/2016 | Valera et al. |
| 2017/0227776 | A1 | 8/2017 | Yokoyama et al. |
| 2019/0004317 | A1* | 1/2019 | Komatsu ................ G02B 6/002 |
| 2019/0155037 | A1 | 5/2019 | Matsumura et al. |
| 2019/0235154 | A1* | 8/2019 | Wang ................ G02F 1/133308 |
| 2019/0235250 | A1* | 8/2019 | Miyasaka ............ G09G 3/3233 |

FOREIGN PATENT DOCUMENTS

| | | |
|---|---|---|
| JP | 2009-516862 A | 4/2009 |
| JP | 2010-91870 A | 4/2010 |
| JP | 2012-198263 A | 10/2012 |
| JP | 2014-085425 A | 5/2014 |
| JP | 2016-072936 A | 5/2016 |
| JP | 2018-182570 A | 11/2018 |
| WO | 2014/155096 A1 | 10/2014 |
| WO | 2018/008577 A1 | 1/2018 |

OTHER PUBLICATIONS

International Search Report of PCT/JP2020/037878 dated Dec. 22, 2020.
Chinese Office Action received in corresponding Chinese Application No. 202080072806.5 dated Mar. 25, 2024.

\* cited by examiner

[FIG. 1]
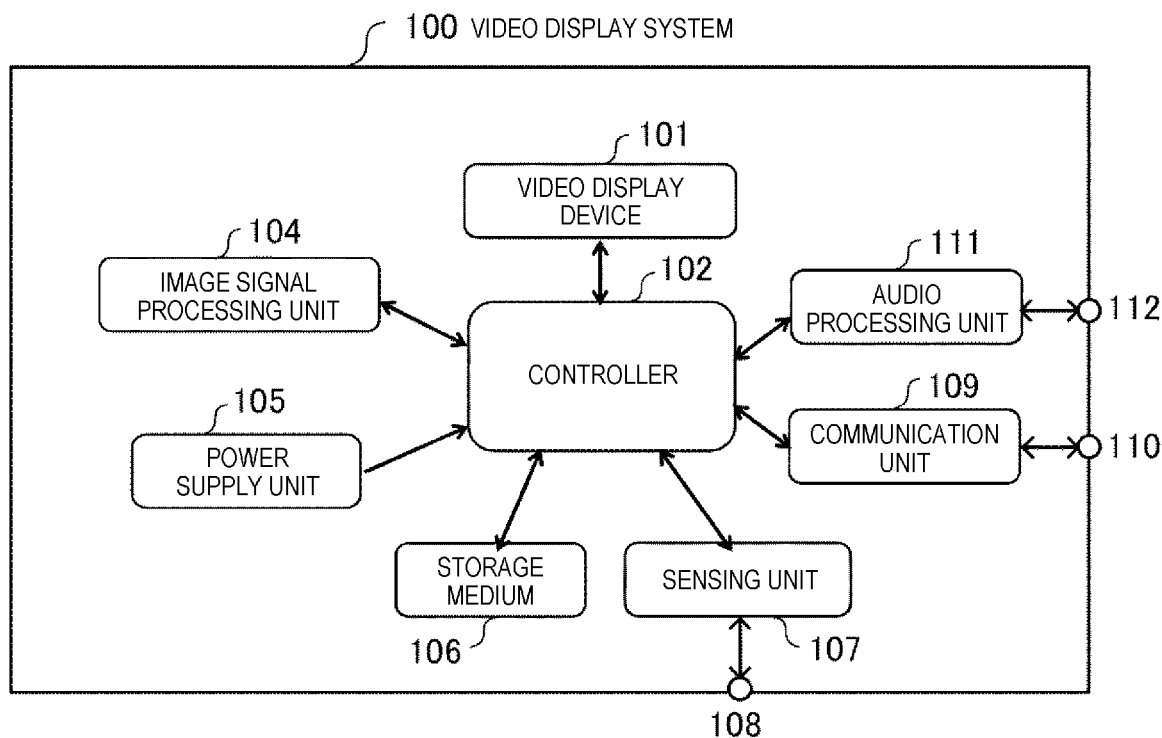
[FIG. 2]
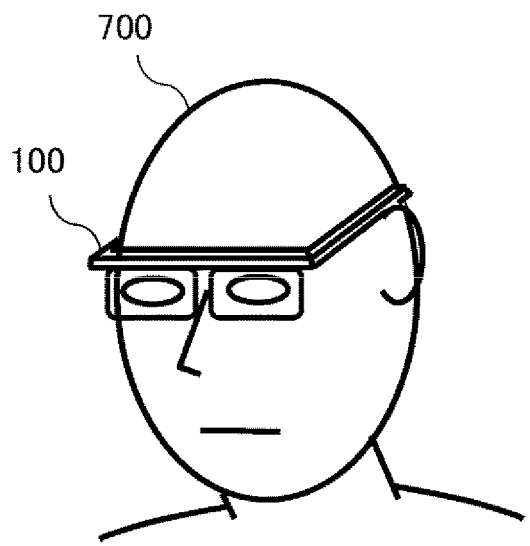

[FIG. 3]
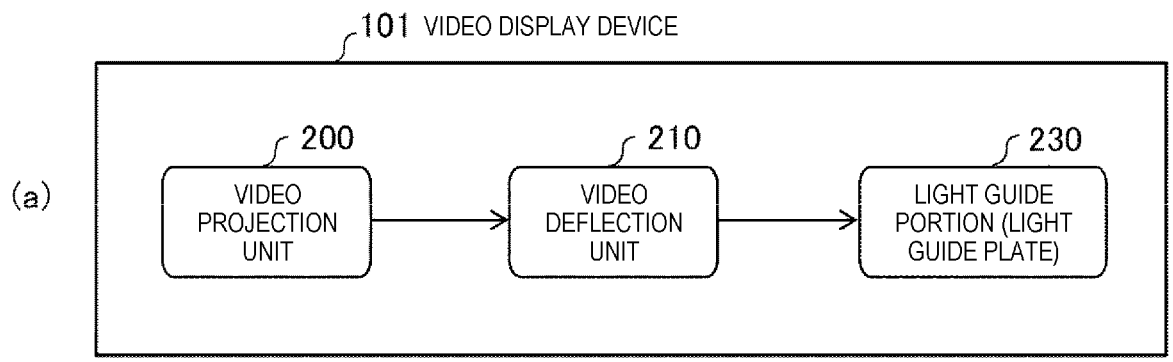
(a)
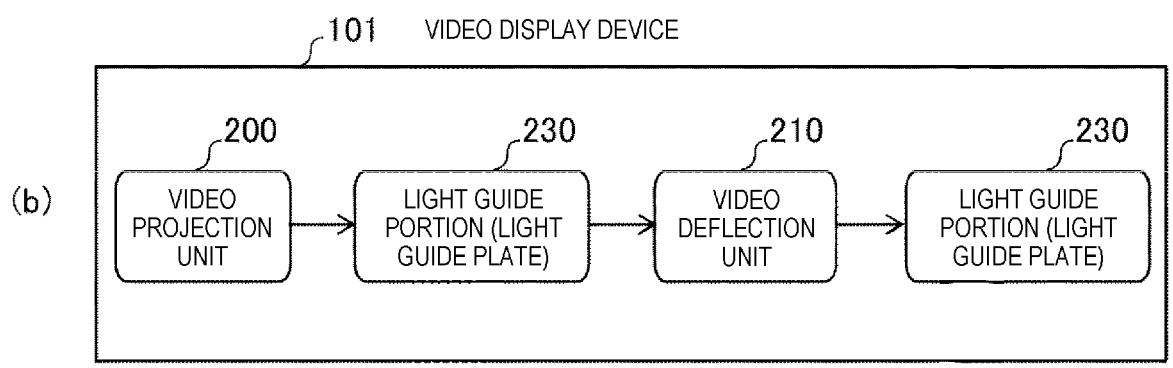
(b)

[FIG. 4]
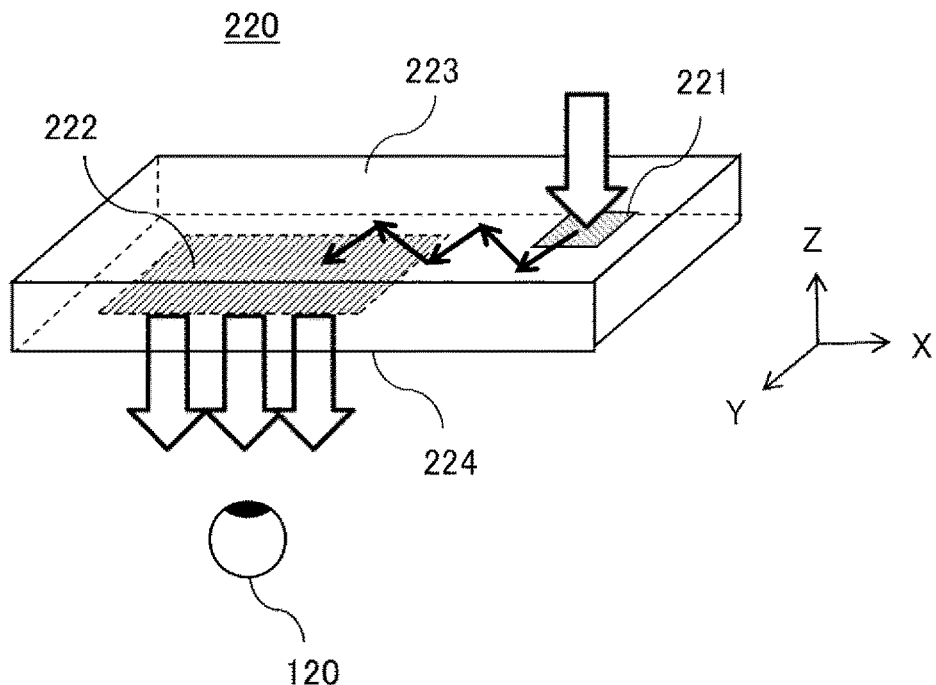
[FIG. 5]
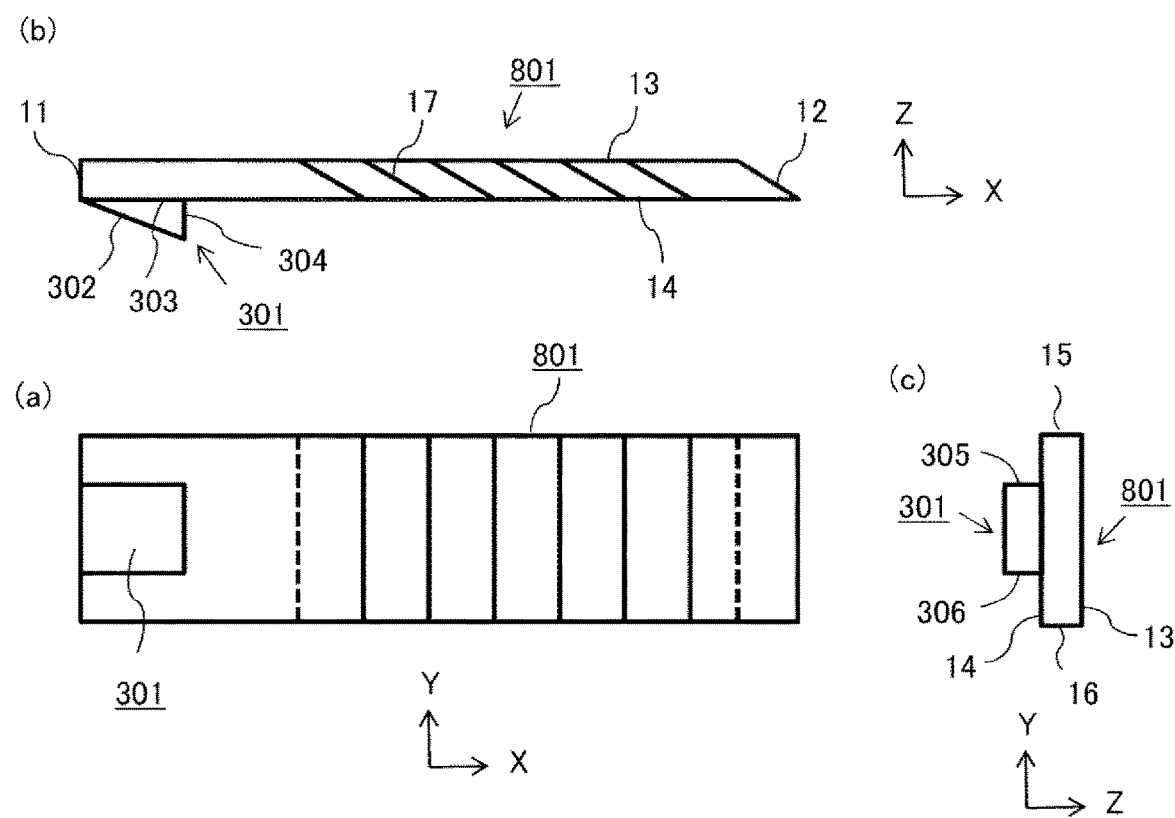

[FIG. 6]
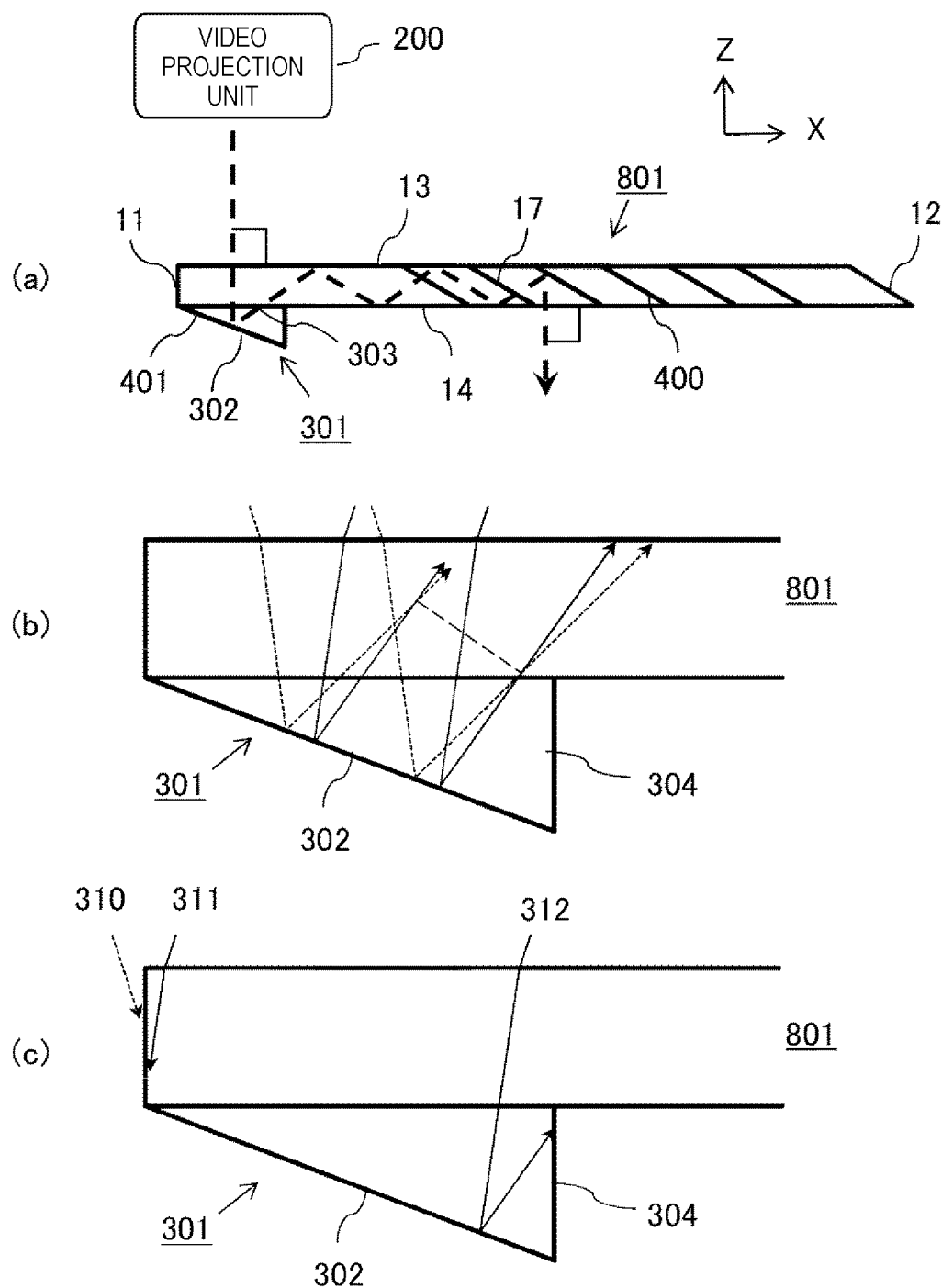

[FIG. 7]
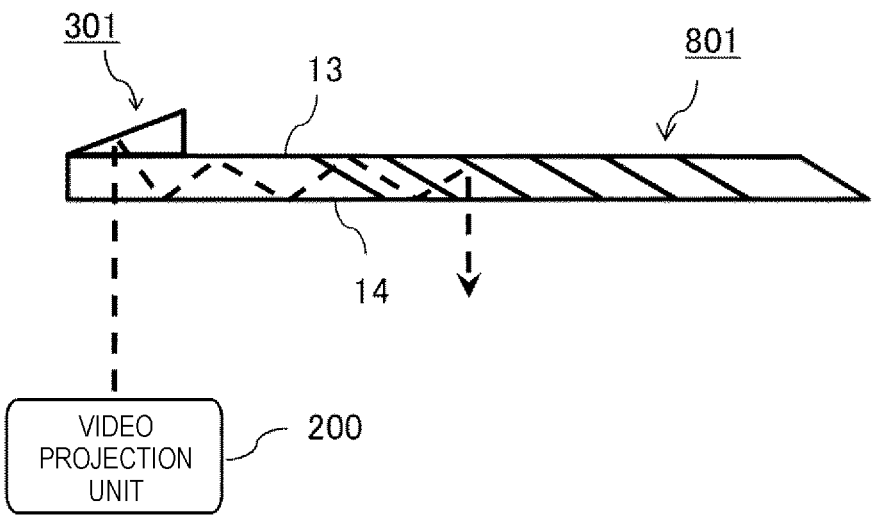
[FIG. 8]
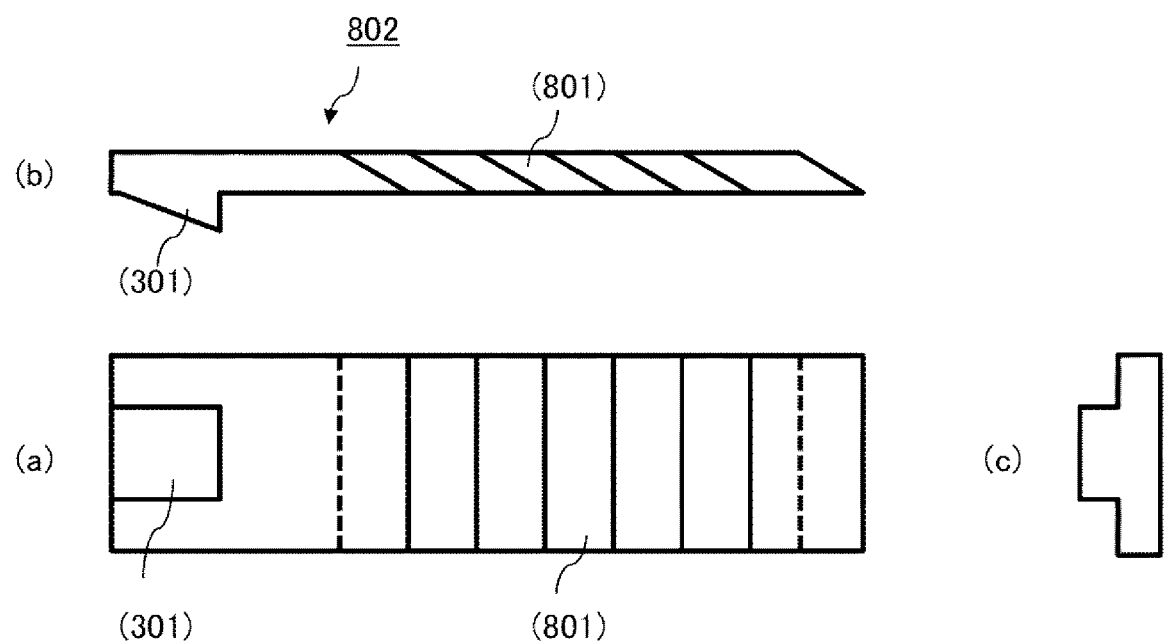

[FIG. 9]
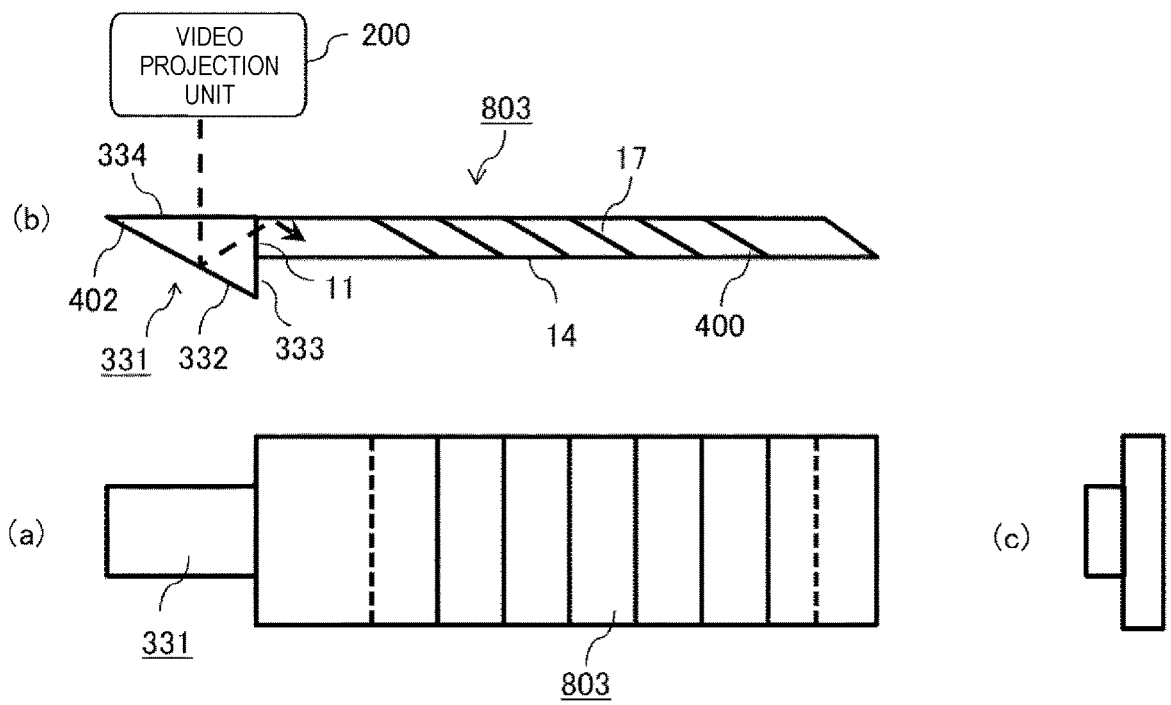
[FIG. 10]
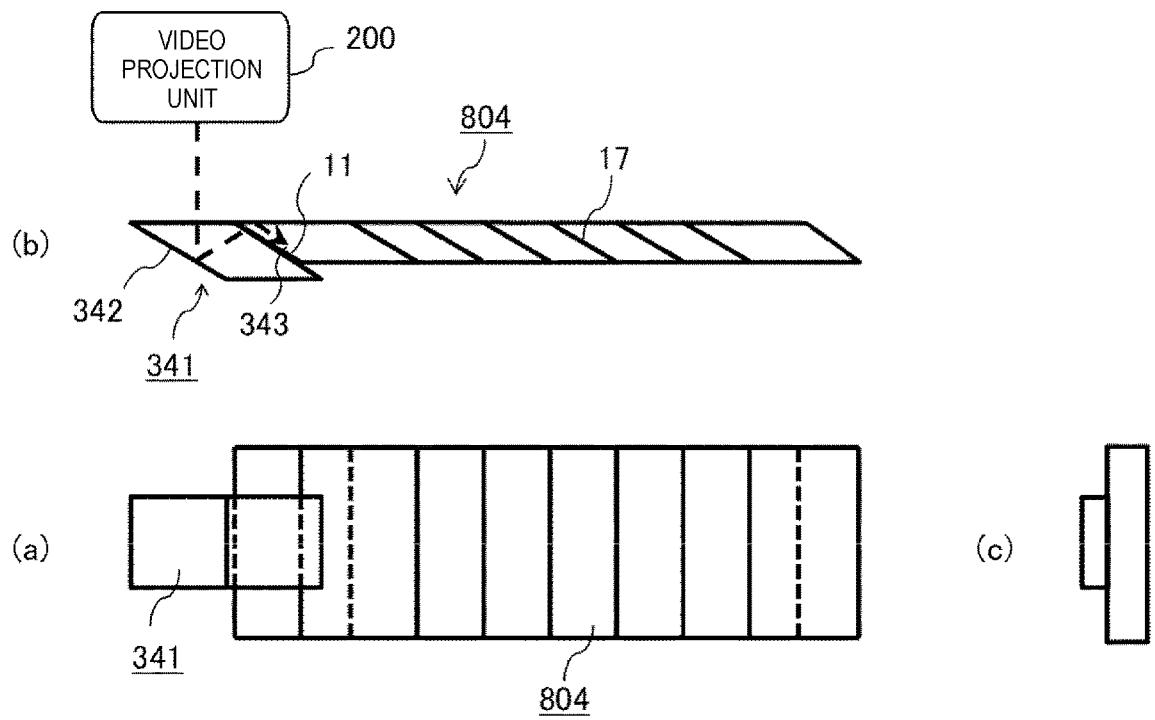

[FIG. 11]
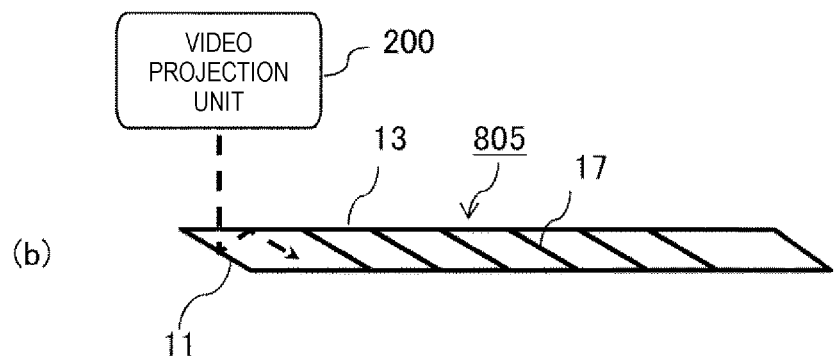
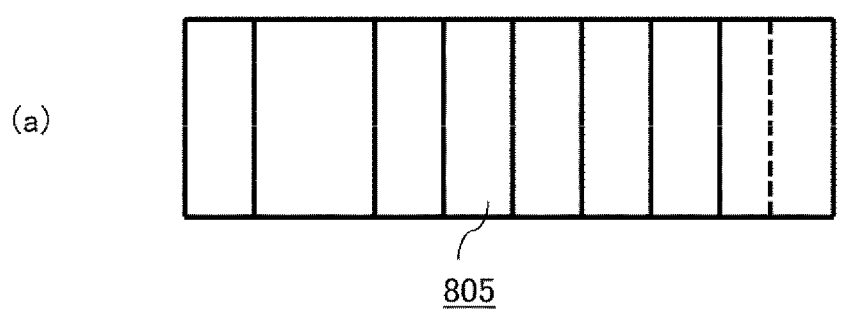
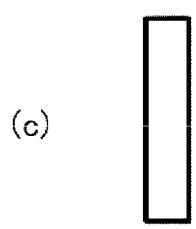
[FIG. 12]
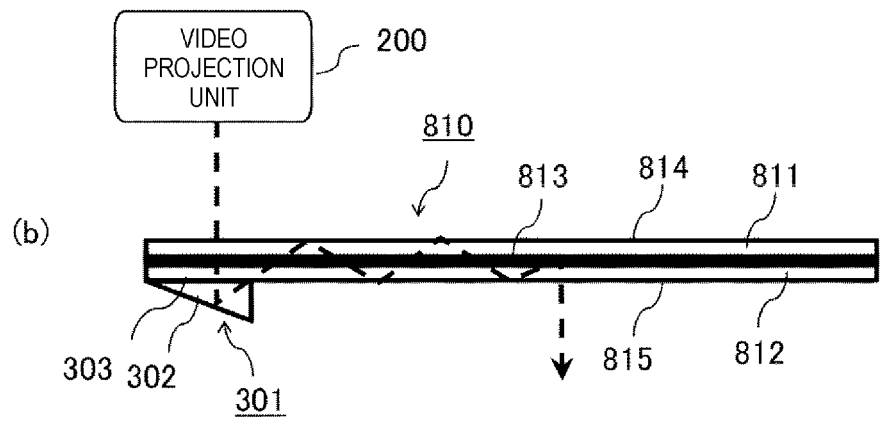
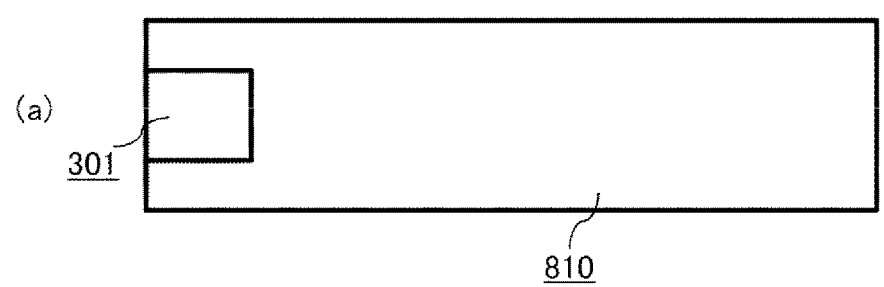
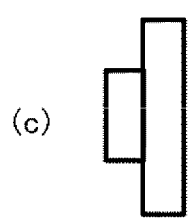

[FIG. 13]
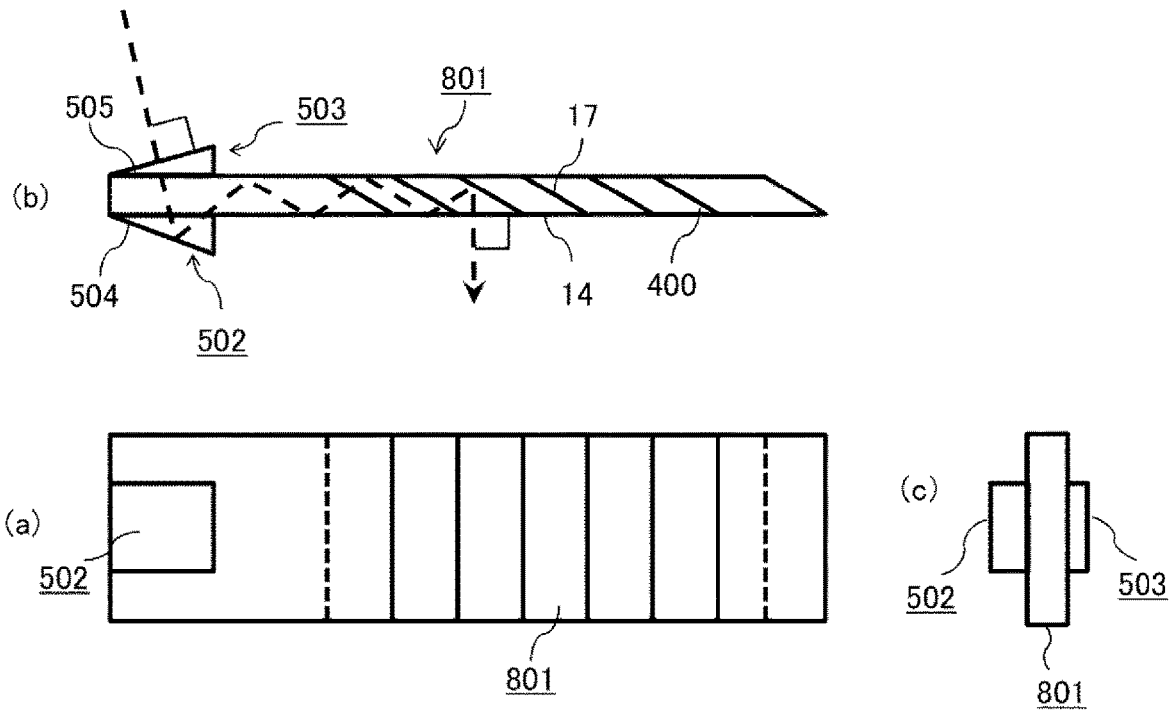
[FIG. 14]
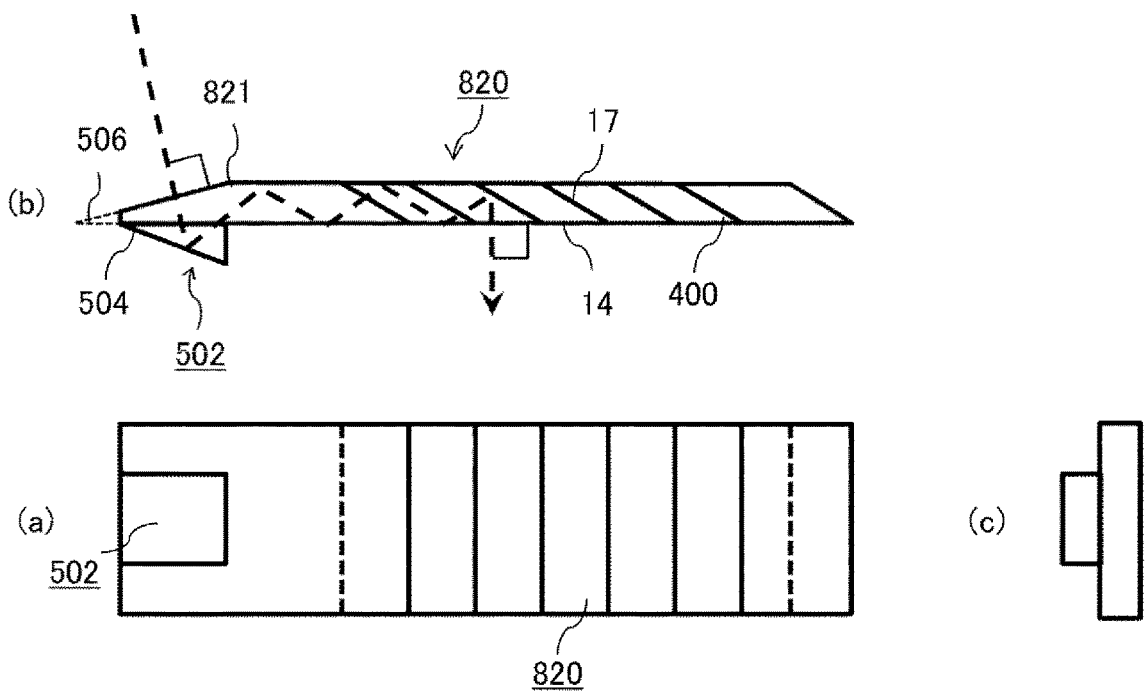

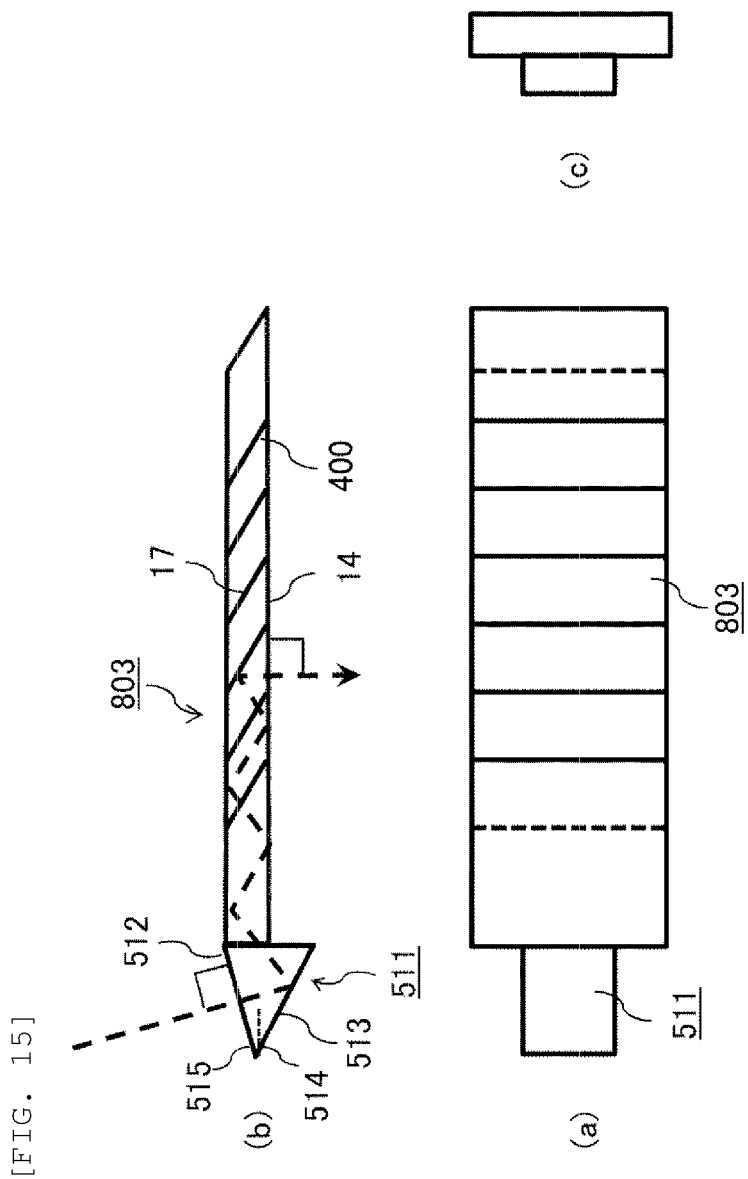
[FIG. 15]

[FIG. 16]
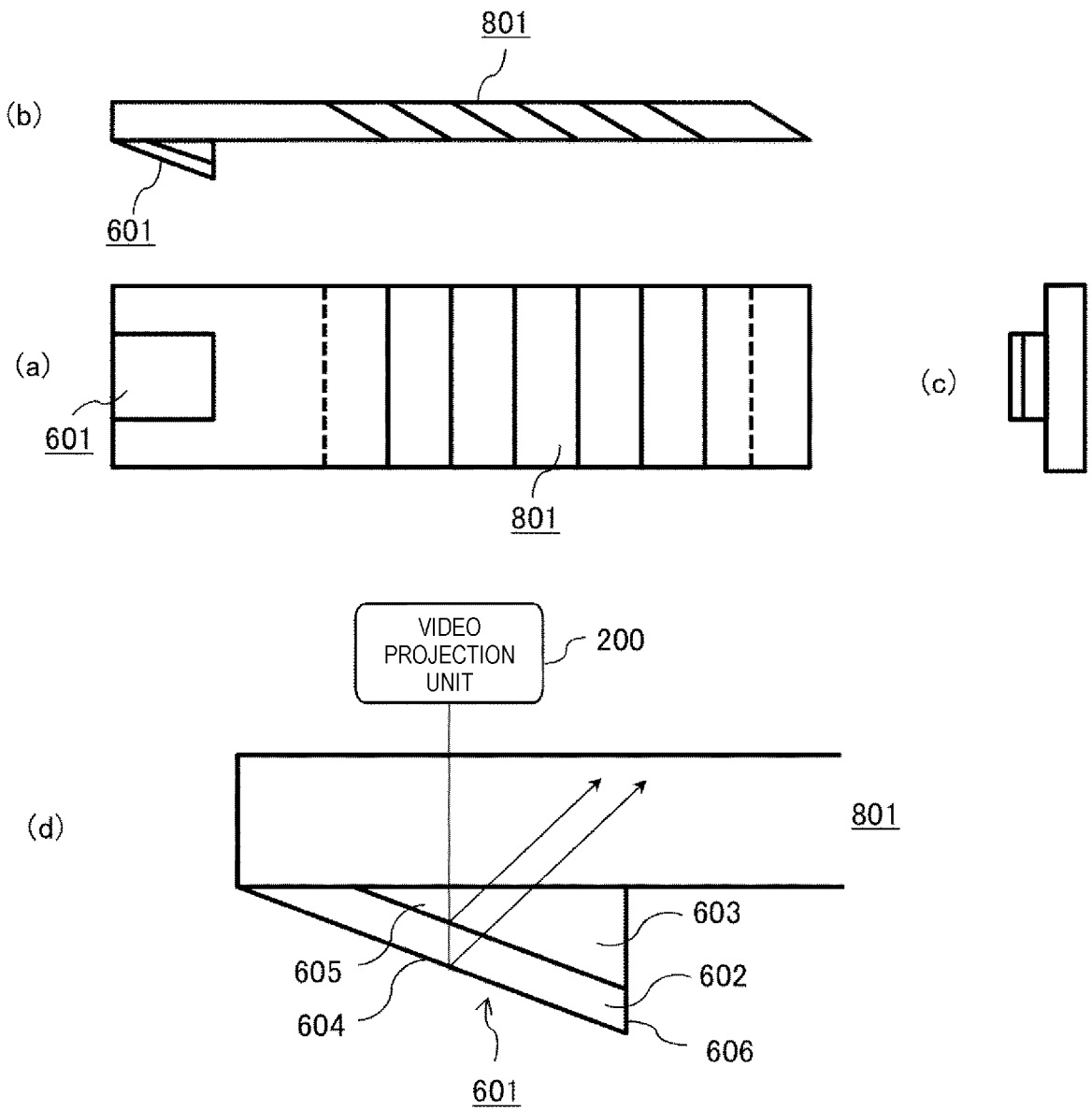

[FIG. 17]
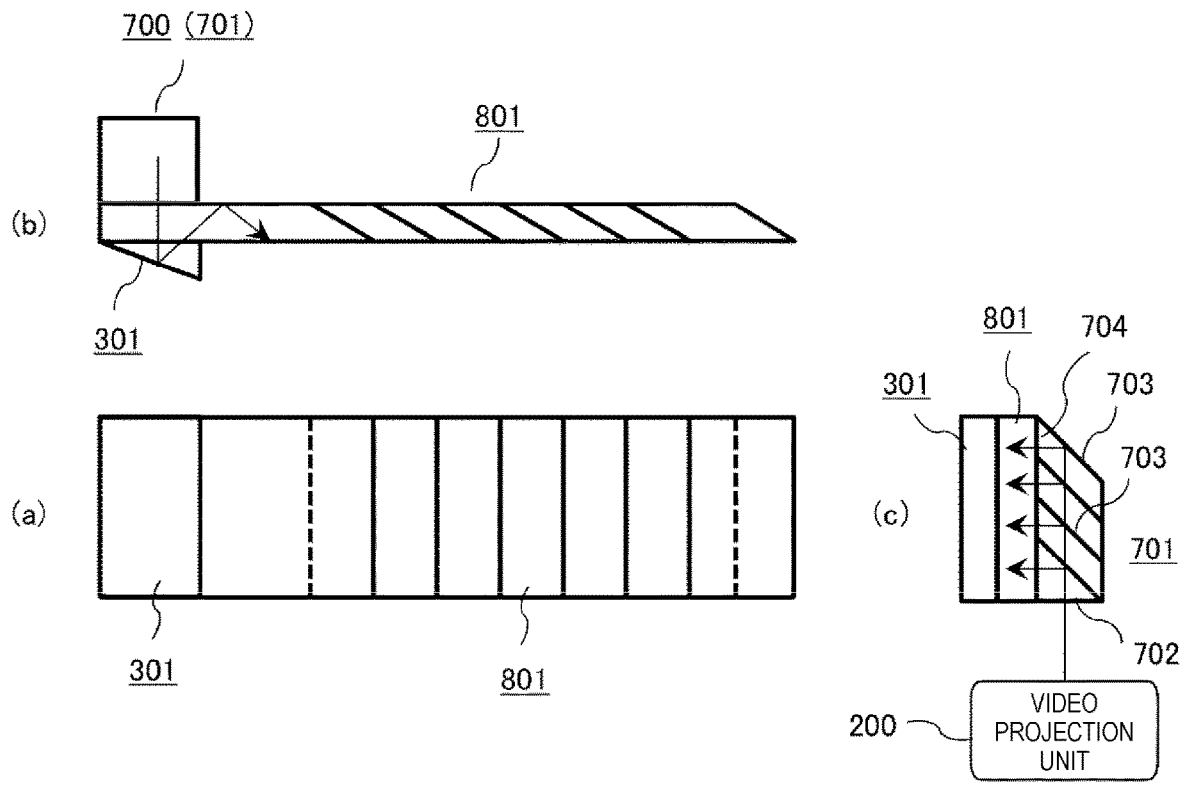
[FIG. 18]
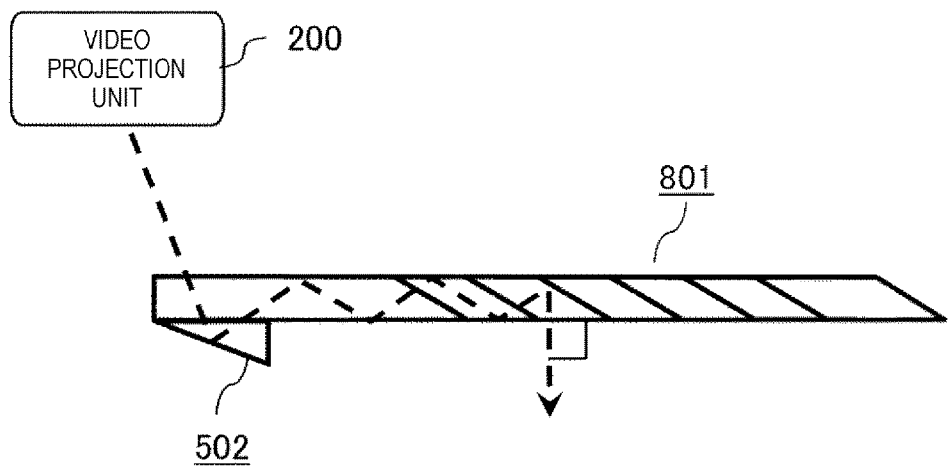

[FIG. 19]
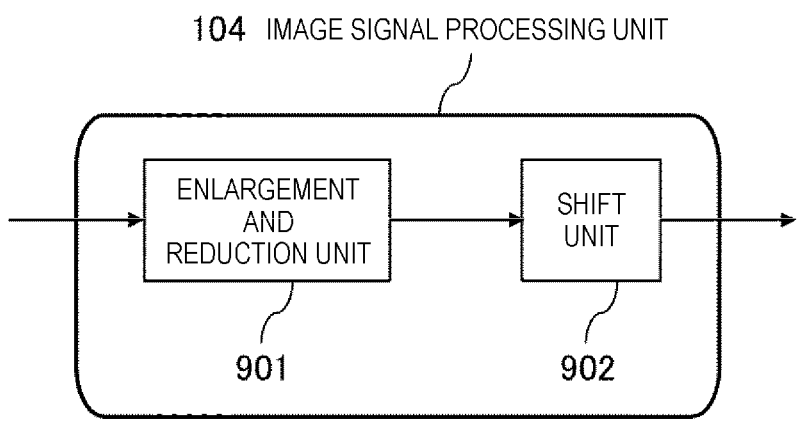

VIDEO DISPLAY DEVICE AND VIDEO DISPLAY SYSTEM

TECHNICAL FIELD

The present invention relates to a video display device and a video display system.

BACKGROUND ART

Video display devices and video display systems such as a head-mounted display that presents a video generated by a video generation device to a user have been known. PTL 1 discloses a light guide plate provided with a plurality of beam splitter surfaces inside as a light guide plate that propagates generated video light to eyes of a user. PTL 1 also discloses a video display system that uses a coupling in prism to combine the video light generated by the video generation device to the light guide plate.

CITATION LIST

Patent Literature

PTL 1: U.S. Patent Application Publication No. 2010/0067110

SUMMARY OF INVENTION

Technical Problem

In the video display system described in PTL 1, the video light generated by the video generation device is reflected by the coupling in prism and is taken into the light guide plate. However, color dispersion due to refraction when the video light enters the coupling in prism or the light guide plate is not particularly considered, and color deviation and video distortion may occur in a video that the user sees.

In view of the problem described above, an object of the invention is to provide a light guide plate type video display device and a video display system that are capable of displaying a video with less color deviation and less video distortion to a user.

Solution to Problem

A video display device according to the invention includes a video projection unit configured to project video light, a video deflection unit, and a light guide portion. The video deflection unit deflects the video light emitted by the video projection unit and causes the video light to propagate to the light guide portion, the light guide portion causes the entered video light to propagate therein and outputs the video light, and the video deflection unit or the light guide portion is configured to reduce color dispersion of the video light outputted from the light guide portion.

A video display system according to the invention includes the video display device described above, and an image signal processing unit configured to generate a projection image signal for the video projection unit to project video light.

Advantageous Effect

According to the invention, a light guide plate type video display device and a video display system that are capable of displaying a video with less color deviation and less video distortion can be provided. Problems, configurations, and effects other than those described above will become apparent based on the following description of embodiments.

BRIEF DESCRIPTION OF DRAWINGS

FIG. 1 is a diagram showing a configuration of functional blocks of a video display system 100 according to a first embodiment.

FIG. 2 is a diagram showing an appearance of the video display system 100.

FIG. 3 is a diagram showing a configuration of functional blocks of a video display device 101.

FIG. 4 is a schematic diagram showing an operation of a light guide plate 220.

FIG. 5 is a diagram showing configuration examples of a video deflection unit 210 and a light guide portion 230.

FIG. 6 is a diagram showing an example of propagation of video light emitted from a video projection unit 200.

FIG. 7 is a diagram showing a configuration in which the arrangement of the video projection unit 200 is changed.

FIG. 8 is a diagram showing another configuration of a light guide plate and a deflection prism.

FIG. 9 is a diagram showing another configuration of the light guide plate and the deflection prism.

FIG. 10 is a diagram showing another configuration of the light guide plate and the deflection prism.

FIG. 11 is a diagram showing another configuration of the light guide plate and the deflection prism.

FIG. 12 is a diagram showing another configuration of the light guide plate and the deflection prism.

FIG. 13 is a diagram showing a configuration of the video deflection unit 210 and the light guide portion 230 according to a second embodiment.

FIG. 14 is a diagram showing another configuration of the video deflection unit 210 and the light guide portion 230.

FIG. 15 is a diagram showing another configuration of the video deflection unit 210 and the light guide portion 230.

FIG. 16 is a diagram showing a configuration of the video deflection unit 210 and the light guide portion 230 according to a third embodiment.

FIG. 17 is a diagram showing a configuration of the video display device 101 according to a fourth embodiment.

FIG. 18 is a diagram showing a configuration of the video display device 101 according to a fifth embodiment.

FIG. 19 is a diagram showing a configuration in which image correction is executed by an image signal processing unit 104.

DESCRIPTION OF EMBODIMENTS

Hereinafter, embodiments of the invention will be described in detail with reference to the drawings. The following description is made for the purpose of describing one embodiment of the invention, and is not intended to limit the scope of the invention. Therefore, a person skilled in the art can adopt embodiments in which these elements or all elements are replaced with equivalent elements, and these embodiments are also included in the scope of the invention.

First Embodiment

FIG. 1 is a diagram showing a configuration of functional blocks of a video display system 100 according to a first embodiment. The video display system 100 is a system having a function of displaying a video, such as a head-mounted display or a head-up display. The video display system 100 includes a video display device 101, a controller 102, an image signal processing unit 104, a power supply unit 105, a storage medium 106, a sensing unit 107, a sensor input and output unit 108, and a communication unit 109, a communication input and output unit 110, an audio processing unit 111, and an audio input and output unit 112.

The video display device 101 is a device that generates a video and displays the video to a user of the video display system 100, and the details will be described later.

The controller 102 comprehensively controls the entire video display system 100. This function of the controller 102 is implemented by a central arithmetic unit such as a central processing unit (CPU). The image signal processing unit 104 generates an image signal of a video to be displayed by the video display system 100. The power supply unit 105 is a power supply device or a battery that supplies power to the video display system 100.

The storage medium 106 stores information necessary for a process executed by a processing unit of the video display system 100 and the video display device 101, and generated information. The storage medium 106 is a storage device such as a random access memory (RAM) or a flash memory, and functions as a storage area for temporarily reading programs and data. The storage medium 106 may include a writable and readable storage medium and a writable and readable storage medium drive unit such as a hard disk drive (HDD), a compact disc-recordable (CD-R), a digital versatile disk-random access memory (DVD-RAM) and a solid state drive (SSD). The controller 102 executes a process by a CPU that operates according to a program read out onto the storage medium 106. A part or all of processes may be executed by another arithmetic unit, for example, hardware such as a field programmable gate array (FPGA) or an application specific integrated circuit (ASIC).

The sensing unit 107 detects a surrounding situation using a sensor. The sensing unit 107 detects a situation using a signal input to the sensor input and output unit 108, for example, from sensors such as an illuminance sensor that detects a surrounding brightness, an inclination sensor or an acceleration sensor that detects a posture, an orientation, a movement or the like of a user, a line-of-sight sensor or a temperature sensor that detects physical conditions of a user, a global navigation satellite system (GNSS) sensor that detects position information of a user, a pressure sensitive sensor, a capacitance sensor, and a barcode reader.

The communication unit 109 is connected to a network (not shown) via the communication input and output unit 110. The communication unit 109 communicates with an information processing terminal (not shown), for example, via short-range or long-range wireless communication such as Bluetooth (registered trademark), Wi-Fi (registered trademark), ultra high frequency (UHF), or very high frequency (VHF), or wired communication. The audio processing unit 111 receives an audio input or outputs an audio using the audio input and output unit 112 such as a microphone or an earphone.

It is sufficient that the video display system 100 according to the present embodiment has a function of displaying a video, and the sensing unit 107, the sensor input and output unit 108, the communication unit 109, the communication input and output unit 110, the audio processing unit 111, and the audio input and output unit 112 can be omitted.

FIG. 2 is a diagram showing an appearance of the video display system 100. The video display system 100 shown in FIG. 2 is a case of a head-mounted display (also referred to as a smart glass) that can be used by a user 700 by wearing the head-mounted display on the head of the user 700.

FIG. 3 is a diagram showing a configuration of functional blocks of the video display device 101, and two configurations (a) and (b) will be described.

The video display device 101 in (a) of FIG. 3 includes a video projection unit 200, a video deflection unit 210, and a light guide portion 230. The video projection unit 200 includes a video generation device (not shown), and generates and outputs video light that is a video to be displayed by the video display device 101. The video light emitted by the video projection unit 200 enters the video deflection unit 210. The video deflection unit 210 deflects the video light output by the video projection unit 200 and propagates the video light to the light guide portion 230. In other words, the video light entering the video deflection unit 210 is deflected by the video deflection unit 210, is emitted from the video deflection unit 210, and enters the light guide portion 230. The light guide portion 230 propagates the entered video light inside by, for example, total reflection of an inner surface of the light guide portion 230 and outputs the video light to the outside. The following light guide plate is used as the light guide portion 230.

As in the video display device 101 in (b) of FIG. 3, the light guide plate may be configured such that the video light emitted from the video projection unit 200 once enters the light guide portion 230, is propagated in the light guide portion 230, is emitted from the light guide portion 230, and enters the video deflection unit 210.

FIG. 4 is a schematic diagram showing an operation of the light guide plate 220. Hereinafter, XYZ axes are defined so as to describe the direction. The X axis is set to a longitudinal direction (propagation direction of the video light) of the light guide plate 220, the Y axis is set to a lateral direction of the light guide plate 220, and the Z axis is set to an entrance and emission direction of the video light.

The light guide plate 220 includes a light input unit 221 and a light output unit 222. The video light emitted by the video deflection unit 210 enters the inside of the light guide plate 220 from the light input unit 221 of the light guide plate 220, and propagates inside the light guide plate 220 (in the X direction) due to total reflection at internal reflection surfaces 223 and 224 of the light guide plate 220. The video light propagating inside the light guide plate 220 is output from the light output unit 222 (in the Z direction). A part of the video light output from the light output unit 222 of the light guide plate 220 enters eyes 120 of the user. By perceiving the light that enters the eyes 120, the user can visually recognize the video displayed by the video display device 101.

FIG. 5 is a diagram showing configuration examples of the video deflection unit 210 and the light guide portion 230. The light guide portion 230 includes a light guide plate 801, and the video deflection unit 210 includes a deflection prism 301. (a) of FIG. 5 is a front view (a view from the Z direction), (b) of FIG. 5 is a plan view (a view from the Y direction), and (c) of FIG. 5 is a side view (a view from the X direction).

The light guide plate 801 is a hexahedron, and includes an end surface 11, a terminal surface 12, a first internal reflection surface 13, a second internal reflection surface 14, an upper surface 15, and a lower surface 16. The first internal reflection surface 13 and the second internal reflection surface 14 are substantially parallel to each other. The light guide plate 801 includes N beam splitter surfaces 17 (N is an integer of 1 or more) inside. The N beam splitter surfaces 17 are substantially parallel to each other.

The deflection prism 301 is a triangular prism and includes a reflection surface 302 and other surfaces 303 and 304.

The light guide plate 801 and the deflection prism 301 are made of a medium that is highly transparent. The materials of the light guide plate 801 and the deflection prism 301 may be, for example, glass or resin. In order to prevent the video from being displayed in multiple, the materials of the light guide plate 801 and the deflection prism 301 are those having no birefringence or having little birefringence.

The video deflection unit 210 integrally adheres to the light guide portion 230 or optically adheres to the light guide portion 230. That is, in FIG. 5, the second internal reflection surface 14 of the light guide plate 801 and the surface 303 of the deflection prism 301 optically adhere to each other. The adhesion between the light guide plate 801 and the deflection prism 301 may be performed using a transparent adhesive, and may be performed by inorganic bonding (optical contact). When the light guide plate 801 and the deflection prism 301 adhere to each other with an adhesive, the adhesive is prevented from squeezing out to a part of the second internal reflection surface 14. The surface 303 does not come into contact with the part of the second internal reflection surface 14. Accordingly, it is possible to prevent deterioration of image quality caused by widening or blurring of the video due to the squeezed-out adhesive.

FIG. 6 is a diagram showing an example of the propagation of the video light emitted from the video projection unit 200. (a) is an overall diagram of the light guide plate 801 and the deflection prism 301, and (b) and (c) are partially enlarged diagrams.

As shown in (a) of FIG. 6, the video light emitted from the video projection unit 200 enters the light guide plate 801 from the first internal reflection surface 13, passes through an adhesive portion between the light guide plate 801 and the deflection prism 301, and enters the deflection prism 301. In the deflection prism 301, the video light is reflected and deflected by the reflection surface 302. The deflected video light passes through the adhesive portion between the light guide plate 801 and the deflection prism 301, and re-enters the light guide plate 801. In such a case, since the light guide plate 801 and the deflection prism 301 adhere to each other, the video light is surely propagated to the light guide plate 801 without the total reflection occurring at a boundary between the light guide plate 801 and the deflection prism 301.

The video light re-entering the light guide plate 801 is totally reflected between the first internal reflection surface 13 and the second internal reflection surface 14 and propagates inside the light guide plate 801. The light propagating inside the light guide plate 801 enters the N beam splitter surfaces 17. In the beam splitter surfaces 17, a part of the entered light is reflected and is emitted to the outside of the light guide plate 801 by passing through the second internal reflection surface 14. The remaining entered light passes through the beam splitter surfaces 17. The user can visually recognize the video by perceiving the light that is reflected at the beam splitter surfaces 17, passes through the second internal reflection surface 14, and is emitted from the light guide plate 801.

It is preferable to configure the light guide plate 801 such that the N beam splitter surfaces 17 and the terminal surface 12 are substantially parallel to each other. Accordingly, a manufacturing process of the light guide plate 801 can be simplified and the cost thereof can be reduced.

In general, a refractive index of an optical medium such as glass or resin varies depending on a wavelength. Therefore, even if the light enters an optical medium at the same incident angle, a refraction angle is different if the wavelength is different (color dispersion). Accordingly, from a time when the video light is emitted from the video projection unit 200 and enters the light guide plate 801 until the video light is emitted from the light guide plate 801 and reaches the eyes of the user, color deviation and video distortion may occur due to the color dispersion in light propagation. Therefore, a method for reducing color deviation and video distortion according to the present embodiment will be described.

The refractive index of an optical material constituting the video deflection unit 210 is substantially equal to the refractive index of an optical material constituting the light guide portion 230. For example, the refractive index of an optical material of the deflection prism 301 is substantially equal to the refractive index of an optical material of the light guide plate 801. Accordingly, it is possible to reduce the color deviation and the video distortion that are caused by the color dispersion when the light is propagated from the light guide plate 801 to the deflection prism 301 and when the light is propagated from the deflection prism 301 to the light guide plate 801.

As in an example of light shown in (a) of FIG. 6, the light guide plate 801 and the deflection prism 301 are configured such that the video light emitted from the video projection unit 200 and substantially vertically entering the light guide plate 801 is substantially vertically emitted from the light guide plate 801. Specifically, an angle 401 formed by the reflection surface 302 and the surface 303 is substantially equal to an angle 400 formed by the second internal reflection surface 14 and the beam splitter surfaces 17. Accordingly, since an emission angle from the light guide plate 801 is substantially equal to the incident angle to the light guide plate 801 regardless of the wavelength of the light and the incident angle to the light guide plate 801, the color dispersion is substantially canceled, and it becomes possible to reduce the color deviation and the video distortion that are caused by the color dispersion.

(b) of FIG. 6 illustrates a light beam that is emitted from the video projection unit 200 and propagates inside the light guide plate 801 and the deflection prism 301. In this example, the light beam emitted from the video projection unit 200 passes through the first internal reflection surface 13 without being distracted by the first internal reflection surface 13. The light beam passing through the first internal reflection surface 13 enters the deflection prism 301 without entering the end surface 11. The light beam deflected by the reflection surface 302 of the deflection prism 301 re-enters the light guide plate 801 without entering the surface 304.

(c) of FIG. 6 shows an example which is not preferable for comparison. In this example, light 310 is distracted by the first internal reflection surface 13, and does not pass through the first internal reflection surface 13. Light 311 enters the end surface 11. Further, light 312 enters the surface 304.

According to the configuration in (b) of FIG. 6, it is possible to avoid undesirable light conditions shown in (c) of FIG. 6 and improve utilization efficiency of the video light, and to prevent deterioration of image quality such as dark lines appearing in a video to be visually recognized by the user.

In FIG. 5, it is preferable to apply at least one or both processes of sand-blasting and black-painting onto at least one or all of the end surface 11, the terminal surface 12, the upper surface 15, the lower surface 16 of the light guide plate 801, and the surface 304, an upper surface 305, and a lower surface 306 of the deflection prism 301. Accordingly, it is possible to prevent deterioration of image quality caused by stray light.

Next, various modifications are possible with respect to the present embodiment, and these modifications will be described.

According to the above description based on FIGS. 5 and 6, the video light emitted from the video projection unit 200 enters the light guide plate 801 from the first internal reflection surface 13 of the light guide plate 801, but the invention is not limited thereto.

FIG. 7 is a diagram showing a configuration in which the arrangement of the video projection unit 200 is changed. In this example, the video light emitted from the video projection unit 200 enters the light guide plate 801 from the second internal reflection surface 14 of the light guide plate 801. Accordingly, it is possible to increase a degree of freedom in design of the video display device 101.

According to the above description based on FIGS. 5 and 6, the light guide plate 801 and the deflection prism 301 are described as adhering to each other, but the invention is not limited thereto.

FIG. 8 is a diagram showing another configuration of the light guide plate and the deflection prism. (a), (b) and (c) are a front view, a plan view, and a side view, respectively. In this example, a deflection prism-integrated light guide plate 802 is used in which a light guide plate and a deflection prism are integrated. Accordingly, it is possible to reduce man-hours for causing the light guide plate 801 and the deflection prism 301 to adhere to each other.

According to the above description based on FIGS. 5 and 6, the video light emitted from the video projection unit 200 is described as once passing through the light guide plate 801 and then entering the deflection prism 301, but the invention is not limited thereto.

FIG. 9 is a diagram showing another configuration of the light guide plate and the deflection prism, and shows the configuration by a light guide plate 803 and a deflection prism 331. The deflection prism 331 includes an incident surface 334, a reflection surface 332 and a surface 333. The surface 333 of the deflection prism 331 and the end surface 11 of the light guide plate 803 adhere to each other by a transparent adhesive or inorganic bonding. The video light emitted from the video projection unit 200 enters the deflection prism 331. The video light entering the deflection prism 331 is reflected and deflected by the reflection surface 332, and enters the light guide plate 803 via an adhesive portion between the surface 333 of the deflection prism 331 and the end surface 11 of the light guide plate 803. Accordingly, it is possible to increase the degree of freedom in design or manufacture of the video display device 101.

The refractive index of an optical material of the deflection prism 331 is substantially equal to the refractive index of an optical material of the light guide plate 803. Accordingly, it is possible to reduce the color deviation and the video distortion that are caused by the color dispersion when the light is propagated from the deflection prism 331 to the light guide plate 803.

The light guide plate 803 and the deflection prism 331 are configured such that the video light emitted from the video projection unit 200 and substantially vertically entering the deflection prism 331 is substantially vertically emitted from the light guide plate 803 after propagating through the light guide plate 803. Specifically, an angle 402 formed by the reflection surface 332 and the incident surface 334 is substantially equal to the angle 400 formed by the second internal reflection surface 14 and the beam splitter surfaces 17. Accordingly, since an emission angle from the light guide plate 803 is substantially equal to the incident angle to the deflection prism 331 regardless of the wavelength of the light and the incident angle to the light guide plate 803, the color dispersion is substantially canceled, and it becomes possible to reduce the color deviation and the video distortion that are caused by the color dispersion.

FIG. 10 is a diagram showing another configuration of the light guide plate and the deflection prism, and shows the configuration by a light guide plate 804 and a deflection prism 341. The end surface 11 of the light guide plate 804 is substantially parallel to the beam splitter surfaces 17. Accordingly, a degree of manufacturing difficulty of the light guide plate 804 can be reduced and the cost of the light guide plate 804 can be reduced.

FIG. 11 is a diagram showing another configuration of the light guide plate and the deflection prism, and the light guide plate and the deflection prism are integrated. A deflection prism-integrated light guide plate 805 serves as a light guide plate and a deflection prism, and the end surface 11 of the light guide plate 805 serves as the reflection surface of the video deflection unit 210.

The video light emitted from the video projection unit 200 enters the light guide plate 805 from the first internal reflection surface 13. The video light entering the light guide plate 805 is reflected and deflected by the end surface 11, and is totally reflected and propagates inside the light guide plate 805.

The end surface 11 of the light guide plate 805 is substantially parallel to the beam splitter surfaces 17. Accordingly, an emission angle from the light guide plate 805 is substantially equal to an incident angle to the light guide plate 805 regardless of the wavelength of the light and the incident angle to the light guide plate 805. Therefore, the color dispersion is substantially canceled, and it becomes possible to reduce the color deviation and the video distortion that are caused by the color dispersion. Using the deflection prism-integrated light guide plate 805, the degree of manufacturing difficulty can be reduced, the number of components can be reduced, and the cost can be reduced.

According to the above configuration, the light guide portion 230 is described as a light guide plate provided with one or more beam splitter surfaces 17 inside, but the invention is not limited thereto.

FIG. 12 is a diagram showing another configuration of the light guide plate and the deflection prism, and is an example in which a volume hologram type light guide plate 810 is used as the light guide plate. The volume hologram type light guide plate 810 includes cover layers 811 and 812, and a medium layer 813. The cover layers 811 and 812 are flat plates made of, for example, glass or resin. The cover layer 811 includes a first internal reflection surface 814, the cover layer 812 includes a second internal reflection surface 815. The second internal reflection surface 815 of the volume hologram type light guide plate 810 and the surface 303 of the deflection prism 301 adhere to each other by a transparent adhesive or inorganic bonding. At least a part of the medium layer 813 includes a hologram material. A multiple exposure is applied on the hologram material in advance, and a predetermined hologram is recorded.

The video light emitted from the video projection unit 200 enters the volume hologram type light guide plate 810 from the first internal reflection surface 814, propagates through the inside of the volume hologram type light guide plate 810, and enters the deflection prism 301. The light entering the deflection prism 301 is reflected and deflected by the reflection surface 302, and re-enters the volume hologram type light guide plate 810. The video light re-entering the volume hologram type light guide plate 810 propagates inside the volume hologram type light guide plate 810 while being totally reflected by the first internal reflection surface 814 and the second internal reflection surface 815. The video light propagating inside the volume hologram type light guide plate 810 is diffracted by the hologram recorded on the hologram material of the medium layer 813 and is emitted from the volume hologram type light guide plate 810. The user can visually recognize the video by perceiving a part of the video light emitted from the volume hologram type light guide plate 810.

As described above, according to the first embodiment, when the video light enters the light guide plate and the deflection prism or is emitted from the light guide plate and the deflection prism, it is possible to reduce the color deviation and the video distortion that are caused by the color dispersion, and the light guide plate type video display device 101 and the video display system 100 that are capable of displaying a video with high quality can be provided.

Second Embodiment

In the second embodiment, a configuration is described in which an optical axis of the video light emitted from the video projection unit 200 is not perpendicular to the second internal reflection surface of the light guide plate. In the second embodiment, differences from the above-described embodiment are mainly described, the same components as those according to the above-described embodiment are denoted by the same reference numerals, and the description thereof is omitted.

FIG. 13 is a diagram showing a configuration of the video deflection unit 210 and the light guide portion 230 according to the second embodiment. (a), (b) and (c) are a front view, a plan view, and a side view, respectively. The configuration includes a deflection prism 502 as the video deflection unit 210, and includes the light guide plate 801 as the light guide portion 230. A correction prism 503 is bonded to the light guide plate 801. The correction prism 503 preferably adheres to the light guide plate 801 by a transparent adhesive or inorganic bonding.

The video light emitted from the video projection unit 200 enters the light guide plate 801 from a bonded portion of the correction prism 503 and the light guide plate 801 after entering the correction prism 503 and propagating through the inside thereof.

The refractive index of an optical material of the correction prism 503 is substantially equal to the refractive index of the optical material of the light guide plate 801. The refractive index of an optical material of the deflection prism 502 is substantially equal to the refractive index of the optical material of the light guide plate 801. Accordingly, it is possible to reduce the color deviation and the video distortion that are caused by the color dispersion when the light is propagated from the correction prism 503 to the light guide plate 801, when the light is propagated from the light guide plate 801 to the deflection prism 502, and when the light is propagated from the deflection prism 502 to the light guide plate 801.

As in an example of light shown in (b) of FIG. 13, the light guide plate 801, the deflection prism 502 and the correction prism 503 are configured such that the video light emitted from the video projection unit 200 and substantially vertically entering the correction prism 503 is substantially vertically emitted from the light guide plate 801. Specifically, the light guide plate 801, the deflection prism 502 and the correction prism 503 are configured such that when an angle formed by the second internal reflection surface 14 and the beam splitter surfaces 17 is set to the angle 400, an apex angle of the deflection prism 502 is set to an angle 504, and an apex angle of the correction prism 503 is set to an angle 505, relation of (angle 505)=2×(angle 400)−2×(angle 504) is substantially satisfied. Accordingly, since the emission angle from the light guide plate 801 is substantially equal to the incident angle to the correction prism 503 regardless of the wavelength of the light and the incident angle to the correction prism 503, the color dispersion is substantially canceled, and it becomes possible to reduce the color deviation and the video distortion that are caused by the color dispersion.

Next, various modifications are possible with respect to the present embodiment, and these modifications will be described.

FIG. 14 is a diagram showing another configuration of the video deflection unit 210 and the light guide portion 230. The configuration includes a light guide plate 820 as the light guide portion 230, and the light guide plate 820 includes an input surface 821. The video light emitted from the video projection unit 200 enters the light guide plate 820 from the input surface 821 of the light guide plate 820.

As in an example of light shown in (b) of FIG. 14, the light guide plate 820 and the video deflection unit 210 are configured such that the video light emitted from the video projection unit 200 and substantially vertically entering the input surface 821 of the light guide plate 820 is substantially vertically emitted from the light guide plate 820 to the outside. Specifically, the light guide plate 820 and the video deflection unit 210 are configured such that when the angle formed by the second internal reflection surface 14 and the beam splitter surfaces 17 is set to the angle 400, the apex angle of the deflection prism 502 is set to the angle 504, and an angle formed by the input surface 821 and the second internal reflection surface 14 is set to an angle 506, relation of (angle 506)=2×(angle 400)−2×(angle 504) is substantially satisfied. Accordingly, since an emission angle from the light guide plate 820 is substantially equal to an incident angle to the light guide plate 820 regardless of the wavelength of the light and the incident angle to the light guide plate 820, the color dispersion is substantially canceled, and it becomes possible to reduce the color deviation and the video distortion that are caused by the color dispersion.

FIG. 15 is a diagram showing another configuration of the video deflection unit 210 and the light guide portion 230. The light guide portion 230 includes the light guide plate 803, and the video deflection unit 210 includes a deflection prism 511. The video light emitted from the video projection unit 200 enters the incident surface 512 of the deflection prism 511, is reflected and deflected by a reflection surface 513 of the deflection prism 511, and enters the light guide plate 803 via an adhesive portion of the deflection prism 511 and the light guide plate 803.

As in an example of light shown in (b) of FIG. 15, the light guide plate 803 and the video deflection unit 210 are configured such that the video light emitted from the video projection unit 200 and substantially vertically entering the incident surface 512 of the deflection prism 511 is substantially vertically emitted from the light guide plate 803. Specifically, the light guide plate 803 and the video deflection unit 210 are configured such that when the angle formed by the second internal reflection surface 14 and the beam splitter surfaces 17 is set to the angle 400, an angle formed by the reflection surface 513 and the second internal reflection surface 14 is set to an angle 514, and an angle formed by the incident surface 512 and the second internal reflection surface 14 is set to an angle 515, relation of (angle 515)=2×(angle 400)−2×(angle 514) is substantially satisfied. Accordingly, since the emission angle from the light guide plate 803 is substantially equal to an incident angle to the incident surface 512 of the deflection prism 511 regardless of the wavelength of the light and the incident angle to the incident surface 512 of the deflection prism 511, the color dispersion is substantially canceled, and it becomes possible to reduce the color deviation and the video distortion that are caused by the color dispersion.

According to the second embodiment, the optical axis of the video light emitted from the video projection unit 200 can be set to an angle different from perpendicular to the second internal reflection surface of the light guide plate, and the degree of freedom in design of the video display device 101 can be increased.

Third Embodiment

In a third embodiment, the video deflection unit 210 has a light duplication function. In the third embodiment, differences from the above-described embodiments are mainly described, the same components as those according to the above-described embodiments are denoted by the same reference numerals, and the description thereof is omitted.

FIG. 16 is a diagram showing a configuration of the video deflection unit 210 and the light guide portion 230 according to the third embodiment. (a), (b) and (c) are a front view, a plan view, and a side view, respectively, and (d) is a partially enlarged view of (b). The video deflection unit 210 includes a light duplication deflection prism 601, and the light guide portion 230 includes the light guide plate 801. The light duplication deflection prism 601 is made of two base materials 602 and 603, both of which adhere to each other by a transparent adhesive or inorganic bonding. The light duplication deflection prism 601 includes a reflection surface 604 and a beam splitter surface 605, and the reflection surface 604 and the beam splitter surface 605 are substantially parallel to each other.

The video light emitted from the video projection unit 200 passes through the light guide plate 801 and enters the light duplication deflection prism 601. A part of the video light entering the light duplication deflection prism 601 is reflected by the beam splitter surface 605, and a part of the video light passes through the beam splitter surface 605. The video light reflected by the beam splitter surface 605 re-enters the light guide plate 801. The video light passing through the beam splitter surface 605 is reflected by the reflection surface 604. A part of the video light reflected by the reflection surface 604 passes through the beam splitter surface 605 and re-enters the light guide plate 801. In this way, the light duplication deflection prism 601 duplicates the light, so that a pupil of the video light is duplicated, and the distribution of the video light output from the light guide plate 801 can be more uniform. Accordingly, it is possible to improve the uniformity of a video to be visually recognized by the user.

The reflectance of the beam splitter 605 is preferably 10% or more and 90% or less. More preferably, the reflectance is 10% or more and 50% or less. Accordingly, it is possible to prevent a bias of an intensity ratio of the duplicated video light, and it is possible to improve the uniformity of the video to be visually recognized by the user.

According to the above description, the light duplication deflection prism 601 is described as including one beam splitter surface 605, but the invention is not limited thereto.

The light duplication deflection prism 601 may include two or more beam splitter surfaces 605 that are substantially parallel to each other. Accordingly, it is possible to improve the uniformity of the video to be visually recognized by the user.

It is preferable that one or both processes of the sand-blasting and the black-painting are applied onto a surface 606 of the light duplication deflection prism 601. Accordingly, it is possible to reduce the occurrence of stray light.

According to the third embodiment, by providing the video deflection unit 210 with the light duplication function, it is possible to provide the light guide plate type video display device 101 and the video display system 100 that are capable of allowing a user to visually recognize a more uniform video.

Fourth Embodiment

In a fourth embodiment, the video display device 101 includes a pupil extending unit. In the fourth embodiment, differences from the above-described embodiments are mainly described, the same components as those according to the above-described embodiments are denoted by the same reference numerals, and the description thereof is omitted.

FIG. 17 is a diagram showing a configuration of the video display device 101 according to the fourth embodiment. (a), (b) and (c) are a front view, a plan view, and a side view, respectively. The video display device 101 includes a pupil extending unit 700 among the video projection unit 200, and the video deflection unit 210 and the light guide portion 230. Here, the configuration includes the deflection prism 301 as the video deflection unit 210, and includes the light guide plate 801 as the light guide portion 230. The configuration includes a pupil extending prism 701 as the pupil extending unit 700.

As shown in (c) of FIG. 17, the pupil extending prism 701 includes an input surface 702, one or more beam splitter surfaces 703, and an output surface 704 for the video light. The beam splitter surfaces 703 are substantially parallel to each other. The output surface 704 of the pupil extending prism 701 and the first internal reflection surface 13 of the light guide plate 801 may adhere to each other by a transparent adhesive or inorganic bonding, and may be arranged at a distance by a predetermined interval without adhering to each other.

The video light emitted from the video projection unit 200 enters the pupil extending prism 701 from the input surface 702. The light entering the pupil extending prism 701 enters one beam splitter surface 703, and at least a part of the light is reflected by the beam splitter surface 703. At least a part of the unreflected light passes through the beam splitter surface 703, and enters another beam splitter surface 703. In this way, the light reflected by the beam splitter surfaces 703 is emitted from the output surface 704 and enters the light guide plate 801 from the first internal reflection surface 13.

According to the fourth embodiment, the video light output by the video projection unit 200 is duplicated. Accordingly, even if relative positions of the eyes of the user and the video display device 101 are deviated, it is possible to enlarge an eye box. The eye box is a range in which the user can visually recognize the video. That is, it is possible to provide the light guide plate type video display device 101 and the video display system 100 that have a large eye box.

Fifth Embodiment

In a fifth embodiment, the video display system 100 compensates for the color dispersion by the image signal processing unit 104. In the fifth embodiment, differences from the above-described embodiments are mainly described, the same components as those according to the above-described embodiments are denoted by the same reference numerals, and the description thereof is omitted.

FIG. 18 is a diagram showing a configuration of the video display device 101 according to the fifth embodiment. The configuration includes the deflection prism 502 as the video deflection unit 210, and includes the light guide plate 801 as the light guide portion 230.

Of the video light emitted from the video projection unit 200, the light entering the light guide plate 801 at an angle other than perpendicular is substantially vertically emitted from the light guide plate 801. In this case, the color dispersion may cause the color deviation and the video distortion. Specifically, the video may be deviated (shifted) and output depending on colors such as red, green, or blue, and a horizontal to vertical ratio (aspect ratio) of the video to be output from the light guide plate 801 may be different.

FIG. 19 is a diagram showing a configuration in which the color deviation and the video distortion are corrected by the image signal processing unit 104 according to the present embodiment. The image signal processing unit 104 includes an enlargement and reduction unit 901 and a shift unit 902.

The image signal input to the image signal processing unit 104 is input to the enlargement and reduction unit 901, and is converted into an image signal in which the video is enlarged or reduced. Regarding the enlargement and reduction of the video executed by the enlargement and reduction unit 901, the enlargement and reduction may be linearly executed, or may be non-linearly executed. The image signal output from the enlargement and reduction unit 901 is input to the shift unit 902, and is converted into an image signal in which the video is shifted. The image signal in which the video is shifted is output from the image signal processing unit 104. An amount of enlargement and reduction of the video caused by the enlargement and reduction unit 901, and a shift amount of the video caused by the shift unit 902 are substantially equal to an amount of compensating for the color deviation and the video distortion of the video that are caused by the refraction and the color dispersion until the light enters the light guide plate 801 and is output from the light guide plate 801. Specifically, in order to correct the color deviation and the video distortion that are caused by the color dispersion, the amount of enlargement and reduction and the shift amount may be different depending on R, G, and B of the image signal.

The image signal processing unit 104 may include both the enlargement and reduction unit 901 and the shift unit 902, or may include either one thereof. Accordingly, it is possible to reduce a processing load of the image signal processing unit 104.

According to the fifth embodiment, the image signal processing unit 104 corrects the color deviation and the video distortion that are caused by the color dispersion, so that it is possible to provide the light guide plate type video display device 101 and the video display system 100 that are capable of displaying a video with high quality. Since the incident angle of the video light from the video projection unit 200 to the light guide plate 801 can be set to an angle other than perpendicular, it is possible to increase the degree of freedom in design of the video display device.

The invention is not limited to the above-described embodiments, and includes various modifications and equivalent configurations within the gist of the scope of the appended claims. For example, the above-described embodiments have been described in detail for easy understanding of the invention, and the invention is not necessarily limited to those having all the configurations described above. A part of a configuration according to a certain embodiment may be replaced with a configuration according to another embodiment. A configuration according to a certain embodiment may be added with a configuration according to another embodiment. A part of a configuration according to each embodiment may be added to, deleted from, or replaced with other configurations.

A part or all of the above-described configurations, functions, processing units, processing methods and the like may be implemented by hardware by, for example, being designed with an integrated circuit, or may be implemented by software by a processor interpreting and executing a program for implementing each function.

Information such as a program, a table, and a file for implementing each function can be stored in a storage device such as a memory, a hard disk, and a solid state drive (SSD), or a recording medium such as an IC card, an SD card, and a DVD.

Control lines and information lines indicate those that are considered necessary for description, and not all the control lines and the information lines necessary for implementation are shown. In fact, it may be considered that almost all the configurations are connected with one another.

REFERENCE SIGNS LIST

17: beam splitter surface
100: video display system
101: video display device
102: controller
104: image signal processing unit
105: power supply unit
106: storage medium
107: sensing unit
108: sensor input and output unit
109: communication unit
111: audio processing unit
120: eyes of user
200: video projection unit
210: video deflection unit
220: light guide plate
221: light input unit
222: light output unit
223: internal reflection surface
224: internal reflection surface
230: light guide portion
301, 331, 341, 502: deflection prism
503: correction prism
511: deflection prism
601: light duplication deflection prism
605: beam splitter surface
700: pupil extending unit
701: pupil extending prism
703: beam splitter surface
801: light guide plate
802: deflection prism-integrated light guide plate
803, 804: light guide plate
805: deflection prism-integrated light guide plate
810: volume hologram type light guide plate
813: medium layer
820: light guide plate
901: enlargement and reduction unit
902: shift unit

The invention claimed is:

1. A video display device for displaying a video, the video display device comprising:
a video projection unit configured to project video light;
a video deflection unit including a deflection prism having a first surface and a second surface angled with respect to the first surface at a first angle; and
a light guide portion including a light guide plate, the light guide plate including a first internal reflection surface, a second internal reflection surface, which is parallel to the first internal reflection surface, and a plurality of beam splitter surfaces disposed between the first internal reflection surface and the second internal reflection surface at the first angle,
wherein the video deflection unit deflects the video light emitted by the video projection unit and causes the video light to propagate to the light guide portion,
wherein the light guide portion causes the entered video light to propagate therein and outputs the video light,
wherein the video deflection unit or the light guide portion is configured to reduce color dispersion of the video light outputted from the light guide portion,
wherein the video light emitted by the video projection unit is incident on a portion of the first internal reflection surface and passes through the first internal reflection surface of the light guide portion, enters the deflection prism of the video deflection unit and is deflected, and then re-enters the second internal reflection surface of the light guide portion, and
wherein the first surface of the deflection prism adheres to a portion of the second internal reflection surface of the light guide plate that is opposite of the portion of the first internal reflection surface on which the video light emitted by the video projection unit is incident.

2. The video display device according to claim 1, wherein a refractive index of an optical material constituting the video deflection unit is substantially equal to a refractive index of an optical material constituting the light guide portion.

3. The video display device according to claim 1, wherein the video light emitted by the video projection unit enters the light guide portion substantially perpendicularly with respect to the first internal reflection surface and is output from the light guide portion substantially perpendicularly with respect to the second internal reflection surface.

4. The video display device according to claim 1, further comprising:
a correction prism,
wherein after passing through the correction prism, the video light emitted by the video projection unit passes through the light guide portion, enters the video deflection unit and is deflected, and then re-enters the light guide portion.

5. The video display device according to claim 4, wherein the video light emitted by the video projection unit enters the correction prism substantially perpendicularly with respect to a first surface of the correction prism and is output from the light guide portion substantially perpendicularly with respect to the second internal reflection surface.

6. The video display device according to claim 5, wherein the video light emitted by the video projection unit enters the video deflection unit substantially perpendicularly with respect to the first internal reflection surface.

7. The video display device according to claim 1, further comprising:
a video duplication unit,
wherein the video duplication unit has two or more partially reflection surfaces that reflect at least a part of the light and are approximately parallel to each other, and duplicates the entered video light to output two or more pieces of video light.

8. The video display device according to claim 7, wherein the video light emitted by the video projection unit enters the video duplication unit substantially perpendicularly with respect to the first internal reflection surface and is output from the light guide portion substantially perpendicularly with respect to the second internal reflection surface.

9. The video display device according to claim 1, wherein the light guide plate is a hexahedron.

10. A video display system comprising:
the video display device according to claim 1; and
an image signal processing unit configured to generate a projection image signal for the video projection unit to project video light.

11. A video display system comprising:
a video display device; and
an image signal processing unit,
wherein the video display device includes:
a video projection unit configured to project video light,
a video deflection unit, and a light guide portion,
wherein the video projection unit includes a deflection prism having a first surface and a second surface angled with respect to the first surface at a first angle,
wherein the light guide portion includes a light guide plate, the light guide plate including a first internal reflection surface, a second internal reflection surface, which is parallel to the first internal reflection surface and a plurality of beam splitter surfaces disposed between the first internal reflection surface and the second internal reflection surface at the first angle,
the video deflection unit deflects video light emitted by the video projection unit and causes the video light to propagate to the light guide portion,
the light guide portion causes the entered video light to propagate therein and outputs the video light,
the image signal processing unit executes an image process of compensating color dispersion caused by the video deflection unit and the light guide portion,
wherein the video light emitted by the video projection unit is incident on a portion of the first internal reflection surface and passes through the first internal reflection surface of the light guide portion, enters the deflection prism of the video deflection unit and is deflected, and then re-enters the second internal reflection surface of the light guide portion, and
wherein the first surface of the deflection prism adheres to a portion of the second internal reflection surface of the light guide plate that is opposite of the portion of the first internal reflection surface on which the video light emitted by the video projection unit is incident.

12. The video display system according to claim 11, wherein the image signal processing unit executes an image process of enlarging or reducing an image, an image process of shifting an image, or both of the image processes.

13. The videos display system according to claim 11, wherein the light guide plate is a hexahedron.

* * * * *